(12) United States Patent
Lee

(10) Patent No.: US 8,407,684 B2
(45) Date of Patent: Mar. 26, 2013

(54) MEMORY CARD AND METHOD OF UPDATING MEMORY CARD PROGRAM

(75) Inventor: Jung-pil Lee, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1329 days.

(21) Appl. No.: 11/565,257

(22) Filed: Nov. 30, 2006

(65) Prior Publication Data

US 2008/0091902 A1 Apr. 17, 2008

(30) Foreign Application Priority Data

Oct. 12, 2006 (KR) ........................ 10-2006-0099295

(51) Int. Cl.
*G06F 9/44* (2006.01)
*G06F 9/445* (2006.01)
(52) U.S. Cl. ........................ 717/168; 717/173; 717/174
(58) Field of Classification Search ........................ None
See application file for complete search history.

(56) References Cited

U.S. PATENT DOCUMENTS

| | | | | |
|---|---|---|---|---|
| 4,410,991 | A * | 10/1983 | Lenart ............................. | 714/22 |
| 4,736,362 | A * | 4/1988 | Clark et al. .................... | 370/363 |
| 4,868,780 | A * | 9/1989 | Stern ............................... | 710/72 |
| 5,327,531 | A * | 7/1994 | Bealkowski et al. ............ | 714/6 |
| 5,602,848 | A * | 2/1997 | Andrews et al. ............... | 370/465 |
| 5,610,808 | A * | 3/1997 | Squires et al. .................... | 700/2 |
| 5,761,504 | A * | 6/1998 | Corrigan et al. ............... | 717/168 |
| 5,818,756 | A * | 10/1998 | Sakui et al. ............... | 365/185.17 |
| 5,898,869 | A * | 4/1999 | Anderson ........................ | 713/2 |
| 6,003,113 | A * | 12/1999 | Hoshino ........................ | 711/106 |
| 6,381,741 | B1 * | 4/2002 | Shaw ............................. | 717/168 |
| 6,408,372 | B1 * | 6/2002 | Miyauchi ...................... | 711/202 |
| 6,421,274 | B1 * | 7/2002 | Yoshimura ............... | 365/185.12 |

(Continued)

FOREIGN PATENT DOCUMENTS

JP  10-320189  12/1998
KR  1020030073824  9/2003

(Continued)

OTHER PUBLICATIONS

Ferriere, et al., "TinyNode: A Comprehensive Platform for Wireless Sensor Network Applications", 2006 ACM; [retrieved on Nov. 15, 2012]; Retrieved from Internet <URL:http://dl.acm.org/citation.cfm?id=112777>;pp. 358-365.*

(Continued)

*Primary Examiner* — Thuy Dao
*Assistant Examiner* — Xi D Chen
(74) *Attorney, Agent, or Firm* — F. Chau & Associates, LLC

(57) ABSTRACT

A memory card includes a bus a central processing unit (CPU) connected to the bus, a volatile memory connected to the bus, a nonvolatile memory, and a host interface. The host interface receives a first command signal from a host and outputs a reset signal for resetting the CPU, receives an update application program from the host and outputs it to the volatile memory, receives a second command signal from the host and outputs a reset release signal for releasing a reset state of the CPU, and receives an update program from the host and outputs it to the nonvolatile memory. The CPU executes the update application program stored in the volatile memory to output the update program to the nonvolatile memory in response to the reset release signal.

20 Claims, 5 Drawing Sheets

U.S. PATENT DOCUMENTS

| | | | |
|---|---|---|---|
| 6,523,083 B1* | 2/2003 | Lin et al. | 711/103 |
| 6,636,989 B1* | 10/2003 | Kondo et al. | 714/23 |
| 6,877,063 B1* | 4/2005 | Allegrucci et al. | 711/102 |
| 6,904,457 B2* | 6/2005 | Goodman | 717/173 |
| 7,011,247 B2* | 3/2006 | Drabczuk et al. | 235/451 |
| 7,017,004 B1* | 3/2006 | Calligaro et al. | 711/102 |
| 7,107,364 B2* | 9/2006 | Chen et al. | 710/22 |
| 7,171,606 B2* | 1/2007 | Blackburn et al. | 717/173 |
| 7,269,829 B2* | 9/2007 | Smith et al. | 717/168 |
| 7,277,011 B2* | 10/2007 | Estakhri | 340/540 |
| 7,293,183 B2* | 11/2007 | Lee et al. | 713/320 |
| 7,320,126 B2* | 1/2008 | Chang et al. | 717/168 |
| 7,480,904 B2* | 1/2009 | Hsu et al. | 717/168 |
| 7,654,466 B2* | 2/2010 | Maeda et al. | 235/492 |
| 7,797,694 B2* | 9/2010 | Sonbarse et al. | 717/168 |
| 7,953,985 B2* | 5/2011 | Nishimura et al. | 713/193 |
| 8,091,083 B2* | 1/2012 | Nakano et al. | 717/174 |
| 8,250,560 B2* | 8/2012 | Hirayama | 717/174 |
| 2002/0026634 A1* | 2/2002 | Shaw | 717/173 |
| 2003/0182569 A1* | 9/2003 | Matsuzaki et al. | 713/193 |
| 2003/0217358 A1* | 11/2003 | Thurston et al. | 717/174 |
| 2004/0044917 A1 | 3/2004 | Lee et al. | |
| 2004/0083469 A1* | 4/2004 | Chen et al. | 717/174 |
| 2006/0282609 A1* | 12/2006 | Jo | 711/103 |
| 2007/0028037 A1* | 2/2007 | Kang | 711/104 |
| 2008/0216066 A1* | 9/2008 | Oh | 717/173 |
| 2008/0307409 A1* | 12/2008 | Lu et al. | 717/174 |
| 2011/0093843 A1* | 4/2011 | Endo et al. | 717/173 |

FOREIGN PATENT DOCUMENTS

| | | |
|---|---|---|
| KR | 1020030085118 A | 10/2003 |
| KR | 1020040092172 A | 11/2004 |
| KR | 1020040103084 A | 12/2004 |
| KR | 1020050041667 A | 5/2005 |
| KR | 1020050097813 | 10/2005 |

OTHER PUBLICATIONS

Kim, et al., "Architecture Exploration of NAND Flash-based Multimedia Card", 2008 EDAA: [retrieved on Nov. 15, 2012]; Retrieved from Internet <URL:http://dl.acm.org/citation.cfm?id=1403375>;pp. 218-223.*

Koulouras, et al., "Embedded Compact Flash", 2005 IEEE; [retrieved on Nov. 15, 2012]; Retrieved from Internet <URL:http://ieeexplore.ieee.org/stamp/stamp.jsp?tp=&arnumber=1492715>;pp. 27-34.*

Kiyohara, Mii, "BPE Acceleration Technique for S/W Update for Mobile Phones", 2010 IEEE; [retrieved on Nov. 15, 2012]; Retrieved from Internet <URL:http://ieeexplore.ieee.org/stamp/stamp.jsp?tp=&arnumber=5474756>;pp. 592-599.*

English Abstract for Publication No. 10-320189.
English Abstract for Publication No. 1020030083118 A.
English Abstract for Publication No. 10200492172 A.
English Abstract for Publication No. 102004103084 A.
English Abstract for Publication No. 1020050041667 A.

* cited by examiner

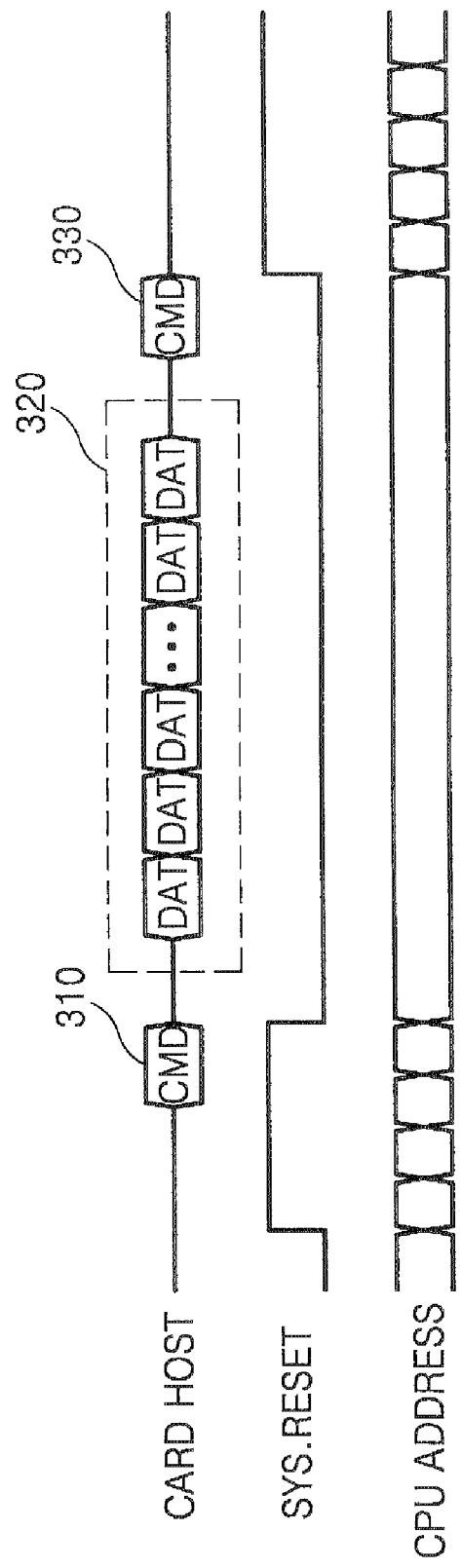

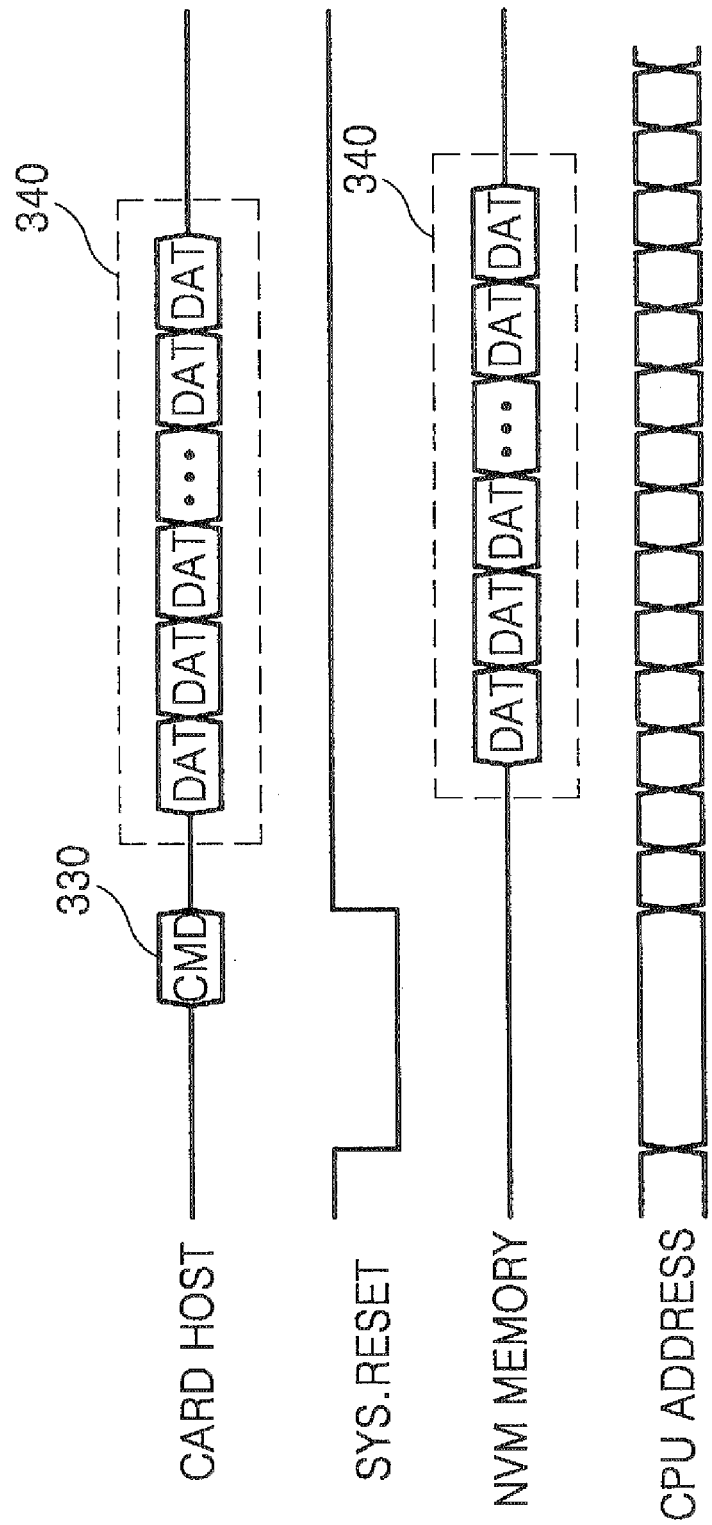

MEMORY CARD AND METHOD OF UPDATING MEMORY CARD PROGRAM

CROSS-REFERENCE TO RELATED PATENT APPLICATION

This application claims priority to Korean Patent Application No. 2006-0099295, filed on Oct. 12, 2006, the disclosure of which is incorporated by reference in its entirety herein.

BACKGROUND OF THE INVENTION

1. Technical Field

The present disclosure relates to a memory card and a method of updating a program for driving the same.

2. Discussion of the Related Art

FIG. 1 is a functional block diagram of a conventional memory card 100. Referring to FIG. 1, the memory card 100 includes a host, a control block 10, and a non-volatile memory 170. The control block 10 includes a host interface 110, a volatile memory 120, a buffer 130, a read-only memory (ROM) 140, a central processing unit (CPU) 150, a non-volatile memory interface 160, and a bus 180.

Conventional methods of storing a driving program for driving the memory card 100 may be categorized according to where the driving program is stored, such as in the ROM 140, in the non-volatile memory, or by dividing the driving program into two parts and storing them in the ROM 140 and the non-volatile memory 170, respectively.

The program for driving the memory card 100 needs to be updated in some cases. However, when the driving program is stored according to the above categories, the updating of the driving program suffers from disadvantages due to the nature of the corresponding categories.

In a method which stores the driving program in the ROM 140, the driving program is read directly from the ROM 140 and then executed. However, since the ROM 140 is read-only, the driving program can only be updated by replacing the ROM 140 with a new ROM having the updated driving program.

In a method which stores the driving program in the nonvolatile memory 170, the driving program is stored in the non-volatile memory 170 and then moved to the volatile memory 120 to execute the driving program. Since the non-volatile memory 170 is writable, the driving program can be easily updated. However, the additional step of moving the driving program requires that the volatile memory 120 be large enough to accommodate the driving program, which unfortunately increases the required capacity of the volatile memory 120.

In addition, the memory card 100 must further include circuitry and/or software for properly transmitting the driving program from the nonvolatile memory 170 to the volatile memory 120, thereby increasing the manufacturing costs of the memory card 100.

In a method which divides the driving program into two parts and stores the respective parts in the ROM 140 and the nonvolatile memory 170, when the driving program for the memory card 100 is updated, a static part of the driving program is stored in the ROM 140 and a changeable part thereof is stored in the nonvolatile memory 170. Thus, it is possible to update the driving program for the memory card 100 without incurring additional costs.

However, in order to store the updated program in the nonvolatile memory 170, an update application program that controls updating of the memory card 100 must be present in the ROM 140. Thus, if the update application program has a fault, the driving program cannot be updated. Accordingly, the ROM 140 must be replaced with another ROM.

SUMMARY OF THE INVENTION

According to an exemplary embodiment of the present invention, there is provided a memory card that includes a bus, a central processing unit (CPU) connected to the bus, a volatile memory connected to the bus, a nonvolatile memory, and a host interface. The host interface receives a first command signal from a host and outputs a reset signal for resetting the CPU, receives an update application program from the host and outputs the update application program to the volatile memory, receives a second command signal from the host and outputs a reset release signal for releasing a reset state of the CPU, and receives an update program from the host and outputs the update program to the nonvolatile memory. The CPU executes the update application program stored in the volatile memory to output the update program to the nonvolatile memory, in response to the reset release signal.

The memory card may include a plurality of peripheral circuits. The reset signal may be applied to the peripheral circuit to reset a first group of peripheral circuits from among the peripheral circuits, which may affect storing of the update application program in the volatile memory, and to operate a second group of peripheral circuits from among the peripheral circuits to store the update application program in the volatile memory.

The first command signal may be used to enable the memory card to enter an update mode, and the second command signal may be used to enable the memory card to exit from the update mode.

The memory card may further include a selection circuit outputting the update application program received from the host to the volatile memory or transmitting data received from the host to the buffer in the update mode.

According to an exemplary embodiment of the present invention, there is provided a method of updating a program for driving a memory card. The method includes the steps of storing an update application program received from a host in a volatile memory, and storing an update program received from the host in a nonvolatile memory by executing the update application program stored in the volatile memory.

The storing of the update application program in the volatile memory may include the steps of outputting a central processing unit (CPU) resetting signal in response to a first command signal received from the host, entering an update mode in response to the first command signal and resetting a CPU in response to the CPU reset signal, and receiving the update application program from the host and storing it in the volatile memory.

The storing of the update program in the nonvolatile memory may include the steps of outputting a CPU reset release signal in response to a second command signal received from the host, executing the update application program stored in the volatile memory in response to the CPU reset releasing signal, and storing the update program received from the host in the nonvolatile memory.

The first command signal may be used to enable the memory card to enter the update mode, and the second command signal may be used to enable the memory card to exit from the update mode.

According to an exemplary embodiment of the present invention, there is provided a method of updating a program for driving a memory card. The method includes the steps of receiving a first command signal from a host and entering an update mode, receiving an update application program that is output from the host during the update mode and storing of the update application program in a volatile memory, receiving a second command to release the update mode after the update application program has been stored, and receiving an update program output from the host after the update mode has been released and storing the update program in a nonvolatile memory.

BRIEF DESCRIPTION OF THE DRAWINGS

The above and other aspects of the present invention will become more apparent by describing in detail exemplary embodiments thereof with reference to the attached drawings in which:

FIG. 4A is a timing diagram illustrating a process of storing an update application program for a memory card, according to an exemplary embodiment of the present invention; and FIG. 4B is a timing diagram illustrating a process of storing an update program for a memory card, according to an exemplary embodiment of the present invention.

DETAILED DESCRIPTION OF THE EXEMPLARY EMBODIMENTS

Figure 1:
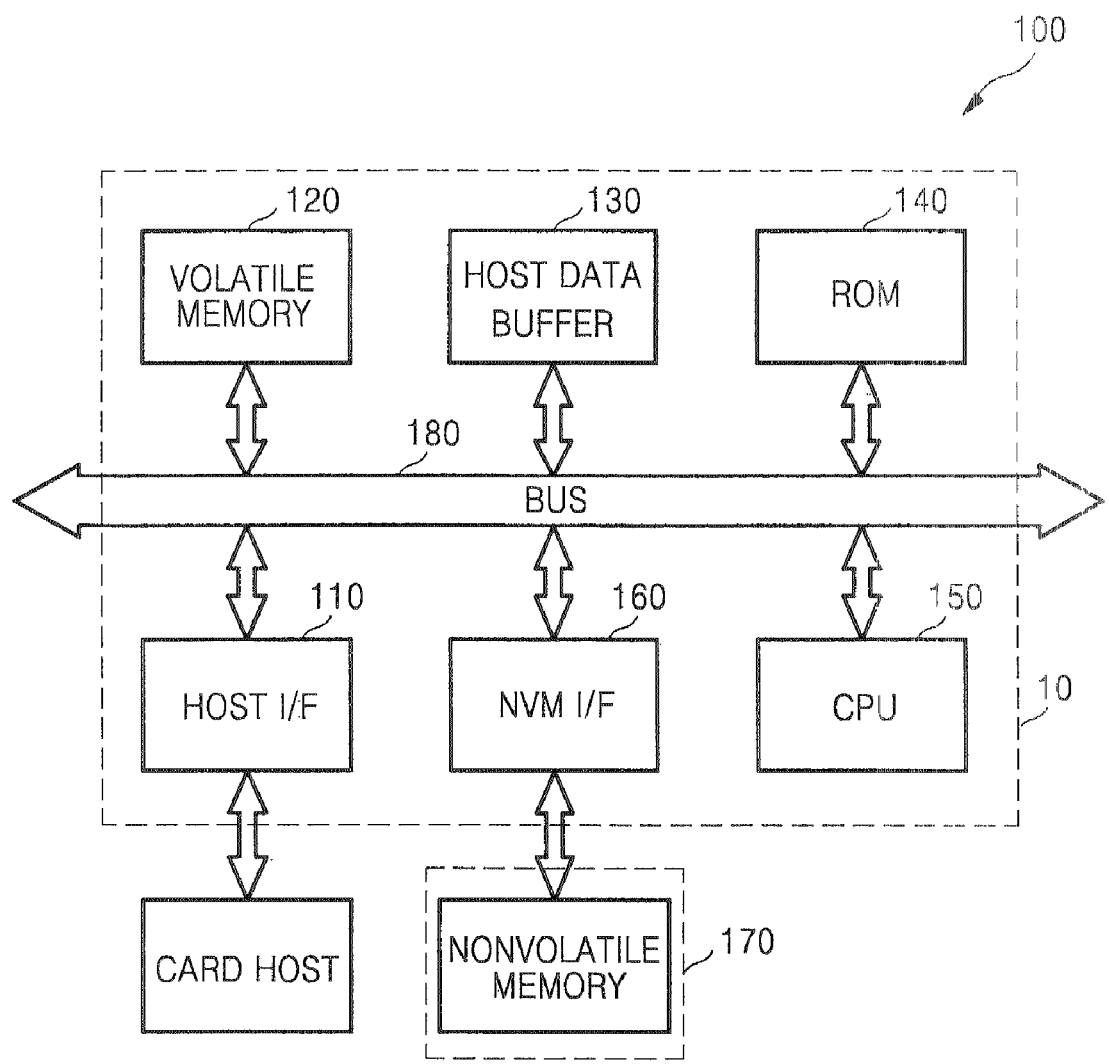
FIG. 1 is a functional block diagram of a conventional memory card.
Figure 2:
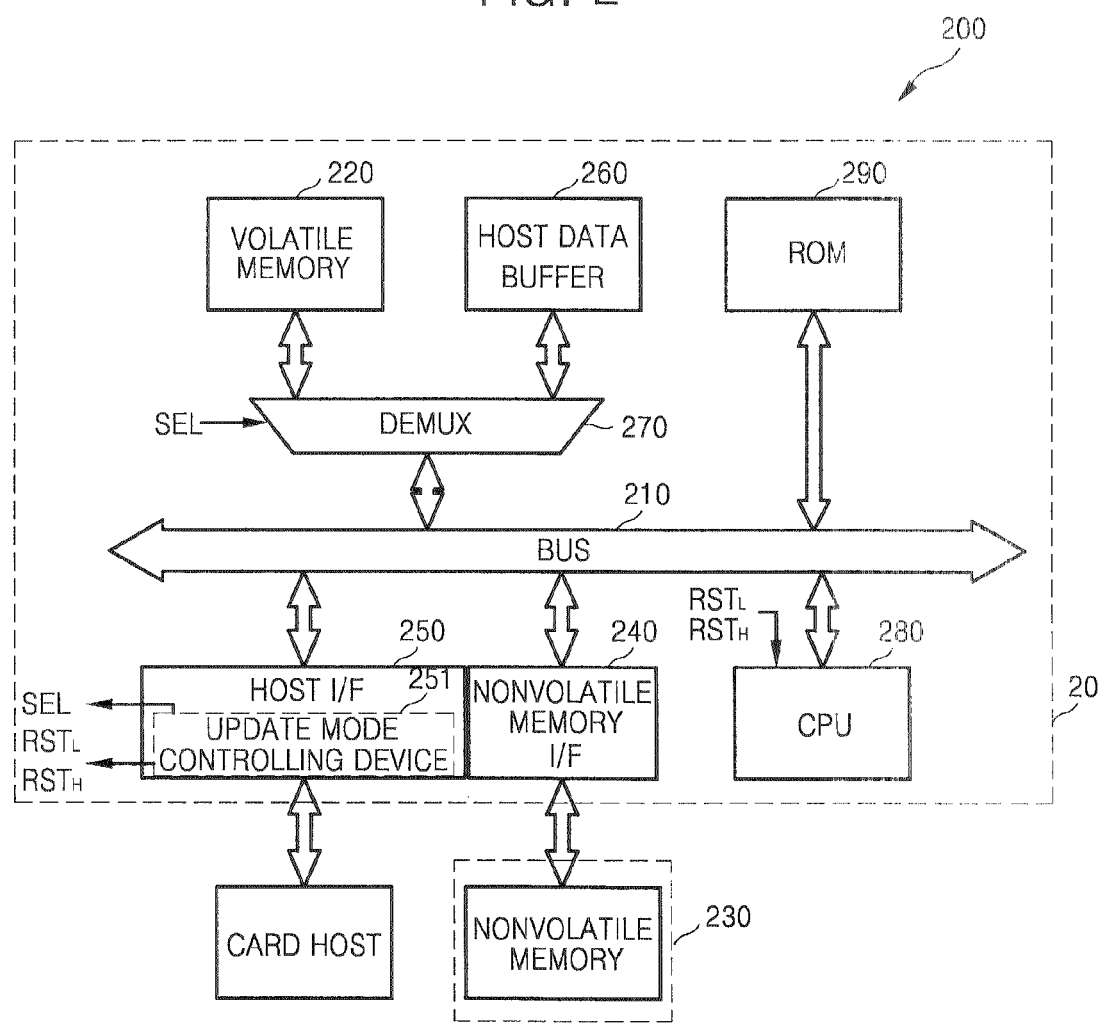
FIG. 2 is a functional block diagram of a memory card according to an exemplary embodiment of the present invention.

FIG. 2 is a functional block diagram of a memory card 200 according to an exemplary embodiment of the present invention. Referring to FIG. 2; the memory card includes a card host, a control block 20 and a nonvolatile memory 230. The control block 20 includes a bus 210, a volatile memory 220, a nonvolatile memory interface 240, a host interface 250, and a central processing unit (CPU) 280. The memory card may be applied to mobile phones, personal digital assistants (PDAs), television sets, voice recorders, digital still cameras, MP3 players, personal computers (PCs), etc.

The volatile memory 220 is connected to the bus 210, and receives and stores an update application program received from the host in an update mode. The volatile memory 220 may be embodied as synchronous random access memory (SRAM) or dynamic random access memory (DRAM).

The nonvolatile memory 230 is connected to the bus 210 via the nonvolatile memory interface 240, and stores a driving program for driving the memory card 200.

The nonvolatile memory 230 also stores an update program received from the host when the driving program is updated. The nonvolatile memory 230 may be embodied as flash Electrically Erasable and Programmable ROM (EEPROM). The nonvolatile memory interface 240 is connected between the bus 210 and the nonvolatile memory 230, enabling the interface of data exchanged between the bus 210 and the nonvolatile memory 230.

The host interface 250 includes an update mode controlling device 251 that controls outputting of the update application program received from the host to the nonvolatile memory 230.

The update mode controlling device 251 receives from the host a first command signal which is an update mode entry signal, and outputs a reset signal $RST_L$ to the CPU 280 and peripheral circuits to reset the CPU 280 and the peripheral circuits (e.g., a buffer 260, a ROM 290, the nonvolatile memory interface 240, and the nonvolatile memory 230) which are not needed to store the update application program in the volatile memory 220, and to operate (release the reset states of) other peripheral circuits (e.g., the host interface 250, is the update mode controlling device 251, and the volatile memory 220), which are needed to store the update application program in the volatile memory 220, in response to the first command signal.

The first command signal may be a reserve command or a vender command output from the host.

When the CPU 280 is reset in response to the reset signal $RST_L$, the host interface 250 receives the update application program from the card host and outputs it to the volatile memory 220 via the bus 210.

In the update mode, the CPU 280 is reset and at substantially the same time, the update mode controlling device 251 of the host interface 250 operates to control the update application program output from the card host to be stored in the volatile memory 220.

The memory card 200 may further include a buffer (the host data buffer 260) which stores host data from the host, and a selection circuit 270.

When the memory card 200 transmits the data received from the host to the buffer 260, the selection circuit 270 outputs the update application program received from the host to the volatile memory 220, in response to a selection signal SEL output from the update mode controlling device 251. The selection circuit 270 may be embodied as a demultiplexer but is not limited thereto.

When storing of the update application program in the volatile memory 220 is completed, the host interface 250 receives a second command signal from the host via the update mode controlling device 251, and outputs a reset release signal $RST_H$ for releasing the reset state of the CPU 280 in response to the received second command signal.

Similar to the first command signal, the second command signal may be a reserve command or a vender command received from the host.

When the reset state of the CPU 280 is released, the memory card 200 exits from the update mode and the host interface 250 outputs the update program received from the host to the nonvolatile memory 230 via the bus 210 and the nonvolatile memory interface 240.

When the memory card 200 enters the update mode, the CPU 280 receives the reset signal $RST_L$ from the update mode controlling device 251, and is reset in response to the received reset signal $RST_L$. In addition, when the memory card 200 exits from the update mode, the reset state of the CPU 280 is released in response to the reset release signal $RST_H$ output from the update mode controlling device 251.

When the reset state of the CPU 280 is released, the CPU 280 executes the update application program stored in the volatile memory 220 to output the update program received from the host to the nonvolatile memory 230.

While the memory card 200 illustrated in FIG. 2, according to an exemplary embodiment of the present invention has been described with respect to a driving program stored in the nonvolatile memory 230, the present invention is not limited thereto. The memory card 200 may further include the ROM 290 that separately stores a part (e.g., system operating system (OS)) of the program, which is not changed even if the driving program for the memory card 200 is updated.

The memory card 200 that further includes the ROM 290, can operate as the memory card 200 described above with reference to FIG. 2 by changing the start address of the CPU 280 to the address of the volatile memory 220 after the update mode is released, or by changing the address of the ROM 290 to that of the volatile memory 220 by changing the address map of the whole memory card 200.

Figure 3:
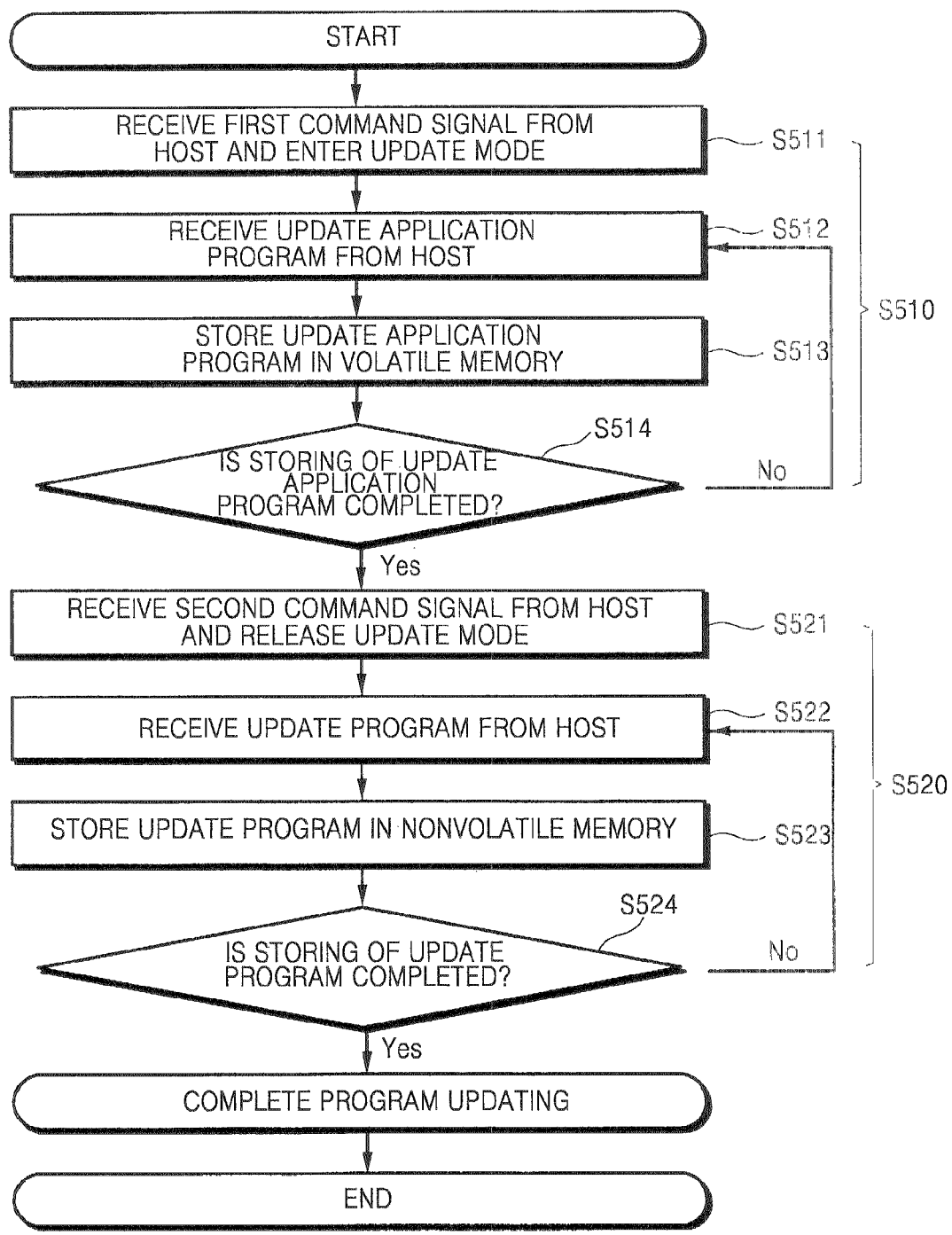
FIG. 3 is a flowchart illustrating a method of updating a driving program for driving a memory card according to an exemplary embodiment of the present invention.

FIG. 3 is a flowchart illustrating a method of updating a driving program for driving a memory card, according to an exemplary embodiment of the present invention. FIG. 4A is a timing diagram illustrating a process of storing an update application program of a memory card, according to an exemplary embodiment of the present invention. FIG. 4B is a timing diagram illustrating an update program of a memory card, according to an exemplary embodiment of the present invention.

Referring to FIGS. 2 through 4B, the method of updating the driving program includes storing an update application program output from the host in the volatile memory 220 (S510), and storing an update program received from the host in the nonvolatile memory 230 by executing the update application program stored in the volatile memory 220 (S520).

The method of updating the driving program for the memory card 200 will now be described in greater detail. First, the memory card 200 receives a first command signal 310 (FIG. 4A) from the host and enters an update mode in response to the received first command signal 310 (S511).

The update mode controlling device 251 outputs a reset signal $RST_L$ to the CPU 280 and peripheral circuits to reset the CPU 280 and the peripheral circuits (e.g., the buffer 260, the ROM 290, the nonvolatile memory interface 240, and the nonvolatile memory 230) that are not needed to store the update application program 320 in the volatile memory 220 and to operate (release the reset states of) other peripheral circuits (e.g., the host interface 250, the update mode controlling device 251, and the volatile memory 220) that are needed to store the update application program 320 (FIG. 4A) in the volatile memory 220, in response to the received first command signal 310.

When resetting of the CPU 280 is completed, the memory card 200 receives the update application program 320 via the host interface 250 and stores it in the volatile memory 220 (S512 and S513).

If the memory card 200 further includes the buffer 260 that stores host data received from the host, and the selection circuit 270, the selection circuit 270 outputs the update application program received from the host in the volatile memory 220 in response to a selection signal SEL received from the update mode controlling device 251.

When storing of the update application program 320 in the volatile memory 220 is completed (S514), the memory card 200 receives the second command signal 330 from the host and releases the update mode in response to the received the second command signal 330. The update mode controlling device 251 outputs a reset release signal $RST_H$ for releasing the reset state of the CPU 280 in response to the received second command signal 330 (S521).

When releasing of the reset state of the CPU 280 is completed, the CPU 280 executes the update application program 320 stored in the volatile memory 220 to receive the update program 340 (FIG. 4B) via the host interface 250, and controls the update program 340 to be stored in the nonvolatile memory 230 (S522 and S523). When storing of the update program 340 is completed, the memory card 200 completes program updating (S524).

As described above, a memory card, and a method of updating a driving program for the memory card according to at least one embodiment of the present invention provides ease of updating the driving program without increasing manufacturing costs.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method for updating a program for driving a memory card, the method comprising:
   receiving a first command from a host interface for changing a mode of the memory card to an update mode;
   resetting a central processing unit (CPU) of the memory card in response to the first command;
   transferring an update application program received from the host interface to a selection circuit of the memory card via a bus, wherein the selection circuit is coupled to the bus, a volatile memory, and a host data buffer, the selection circuit is configured to route one of the update application program from a host interface of the memory card to the volatile memory or host data from the host interface to the host data buffer in response to a selection signal, and wherein the selection circuit is arranged to prevent direct access by the host interface to the volatile memory and the host data buffer;
   outputting the selection signal to the selection circuit to route the update application program to a volatile memory of the memory card;
   executing the update application program stored in the volatile memory by the CPU;
   receiving an update program from the host interface;
   storing the update program in a nonvolatile memory of the memory card; and
   applying, by the host interface, a same reset signal to both the CPU and the host data buffer to reset each when the update application is transferred to the volatile memory.

2. The method of claim 1, further comprising
   generating the reset signal by an update controlling device in the host interface to reset the CPU and reset the host data buffer in response to the first command.

3. The method of claim 1, further comprising:
   receiving a second command from the host interface for releasing the reset signal.

4. The method of claim 3, wherein the update application program is executed by the CPU after receiving the second command for releasing the reset signal.

5. The method of claim 3, wherein the CPU starts from an address of the volatile memory after receiving the second command.

6. The method of claim 1, further comprising:
   transferring the update program from the host interface to a buffer in the memory card.

7. The method of claim 1, wherein the host interface sequentially receives the first command, the update application program, and the update program.

8. The method of claim 1, wherein the nonvolatile memory is one of flash Electrically Erasable and Programmable Read Only Memory (EEPROM).

9. The method of claim 1, wherein the volatile memory is a Static Random Access Memory (SRAM).

10. The method of claim 1, wherein the volatile memory is a Dynamic Random Access Memory (DRAM).

11. A memory card comprising:
    a bus;
    a central processing unit (CPU) coupled to the bus;
    a volatile memory coupled to the bus;
    a non-volatile memory interface that interfaces a nonvolatile memory to the bus;

a host interface for receiving a first command, an update application program, and host data distinct from the program, wherein receipt of the first command changes a mode of the memory card to an update mode to transfer the update application program received from the host interface to the volatile memory through the bus;

a host data buffer; and a selection circuit coupled to the bus, the volatile memory, and the host data buffer, and receiving a selection signal from the host interface, wherein the host interface sets the selection signal to route one of (i) the host data to the host data buffer via the bus and the selection circuit or (ii) the update application program to the volatile memory via the bus and the selection circuit, wherein the selection circuit is arranged to prevent direct access by the host interface to the volatile memory and the host data buffer, wherein the host interface generates a same reset signal to reset both the CPU and the host data buffer to reset each when the update application program is transferred to the volatile memory.

12. The memory card of claim 11, wherein the host interface includes an update mode controlling device to generate the same reset signal, and the update mode control device also generates the selection signal to control the transfer of the update application program to the volatile memory.

13. The memory card of claim 12, wherein the reset signal is generated when the first command is received from the host interface.

14. The memory card of claim 12, wherein the host interface receives a second command to release the reset signal.

15. The memory card of claim 14, wherein the CPU starts from an address of the volatile memory after receiving the second command.

16. The memory card of claim 14, wherein the CPU executes the update application program stored in the volatile memory after receiving the second command.

17. The memory card of claim 11, wherein the host interface sequentially receives the first command, the update application program, and an update program through the host interface.

18. The memory card of claim 11, further comprising:
a read only memory ROM to store a driving program of the memory card.

19. The memory card of claim 11, wherein the nonvolatile memory is one of flash Electrically Erasable and Programmable Read Only Memory (EEPROM).

20. The memory card of claim 11, the volatile memory is one of a Static Random Access Memory (SRAM) or Dynamic Random Access Memory (DRAM).

* * * * *